United States Patent
Hirson et al.

(10) Patent No.: US 11,989,317 B2
(45) Date of Patent: May 21, 2024

(54) MODIFYING ELEMENTS OF A SECURE DOCUMENT WORKFLOW BASED ON CHANGE IN PROFILE OF RECIPIENT

(71) Applicant: DocuSign, Inc., San Francisco, CA (US)

(72) Inventors: Ronald Hirson, San Francisco, CA (US); Darren Hon Kit Louie, Seattle, WA (US); Olivier Pin, Ville d'Avray (FR); Thibault de Valroger, Paris (FR); Ryan James Cox, Oakland, CA (US); Michael Yatsko, Los Altos, CA (US)

(73) Assignee: DOCUSIGN, INC., San Francisco, CA (US)

( * ) Notice: Subject to any disclaimer, the term of this patent is extended or adjusted under 35 U.S.C. 154(b) by 167 days.

(21) Appl. No.: 16/997,725

(22) Filed: Aug. 19, 2020

(65) Prior Publication Data
US 2022/0058287 A1 Feb. 24, 2022

(51) Int. Cl.
*H04L 9/40* (2022.01)
*G06F 21/62* (2013.01)

(52) U.S. Cl.
CPC ........ *G06F 21/6227* (2013.01); *H04L 63/102* (2013.01); *H04L 63/107* (2013.01)

(58) Field of Classification Search
CPC .... G06F 21/6227; G06F 21/316; G06F 21/64; H04L 63/102; H04L 63/107
See application file for complete search history.

(56) References Cited

U.S. PATENT DOCUMENTS

| | | |
|---|---|---|
| 8,949,706 B2 | 2/2015 | McCabe et al. |
| 10,572,649 B2 | 2/2020 | Mathew et al. |
| 10,594,737 B1 | 3/2020 | Verma et al. |
| 11,599,662 B2 | 3/2023 | Hirson et al. |
| 2002/0091532 A1* | 7/2002 | Viets ............ G06F 21/6218 726/15 |

(Continued)

FOREIGN PATENT DOCUMENTS

WO   WO 2016/076904 A1   5/2016

OTHER PUBLICATIONS

E. Bertino and M. Kirkpatrick, "Location-Aware Authentication and Access Control Concepts and Issues," 2009 International Conference on Advanced Information Networking and Applications, Bradford, UK, 2009, pp. 10-15, doi: 10.1109/AINA.2009.50. (Year: 2009).*

(Continued)

*Primary Examiner* — Robert B Leung
(74) *Attorney, Agent, or Firm* — Shumaker & Sieffert, P.A.

(57) ABSTRACT

A system and a method are disclosed for receiving a request for a user to perform a plurality of activities with respect to a secure document, a given activity of the plurality activities being assigned based on a known parameter of the user. The system transmits the request to the user, and responsive to detecting an interaction with the request, determines that the known parameter has changed. The system responsively determines requirements for performing the plurality of activities based on a replacement parameter of the user, determines a replacement activity based on the requirements, and transmits a new request to the user, the new request replacing the given activity with the replacement activity.

17 Claims, 6 Drawing Sheets

(56) References Cited

U.S. PATENT DOCUMENTS

| | | | |
|---|---|---|---|
| 2003/0217122 A1 | 11/2003 | Roese et al. | |
| 2004/0078490 A1* | 4/2004 | Anderson | H04L 61/35 709/219 |
| 2007/0005595 A1* | 1/2007 | Gafter | G06F 21/6218 |
| 2007/0006321 A1* | 1/2007 | Bantz | G06F 21/6218 726/27 |
| 2010/0095365 A1 | 4/2010 | Hsu et al. | |
| 2010/0211997 A1* | 8/2010 | McGeehan | H04L 63/107 726/4 |
| 2011/0030037 A1* | 2/2011 | Olshansky | H04L 63/0209 726/4 |
| 2012/0204235 A1* | 8/2012 | Jaudon | G06F 21/30 726/4 |
| 2013/0198807 A1 | 8/2013 | Herbach et al. | |
| 2013/0212038 A1* | 8/2013 | Marko | G06Q 10/10 705/342 |
| 2013/0254831 A1* | 9/2013 | Roach | H04W 12/082 726/1 |
| 2014/0289821 A1* | 9/2014 | Wilson | G06Q 20/3278 726/5 |
| 2014/0289822 A1* | 9/2014 | Wilson | H04L 9/0819 726/5 |
| 2015/0150090 A1 | 5/2015 | Carroll et al. | |
| 2015/0213568 A1* | 7/2015 | Follis | G06Q 50/18 705/311 |
| 2015/0227727 A1* | 8/2015 | Grigg | H04W 12/63 726/4 |
| 2016/0048696 A1* | 2/2016 | Follis | G06F 21/645 726/28 |
| 2016/0057623 A1 | 2/2016 | Dutt et al. | |
| 2016/0071812 A1 | 3/2016 | Chen et al. | |
| 2017/0046807 A1 | 2/2017 | Ford | |
| 2019/0014441 A1 | 1/2019 | Diamanti et al. | |
| 2019/0079782 A1 | 3/2019 | Goldberg et al. | |
| 2019/0164158 A1* | 5/2019 | Koeppel | G06Q 20/355 |
| 2019/0342276 A1 | 11/2019 | Sherif et al. | |
| 2020/0356686 A1 | 11/2020 | Vijayvargiya | |
| 2020/0372576 A1 | 11/2020 | Sundaram et al. | |
| 2021/0042398 A1 | 2/2021 | Volluru | |
| 2021/0397793 A1 | 12/2021 | Li et al. | |
| 2022/0058278 A1 | 2/2022 | Hirson et al. | |

OTHER PUBLICATIONS

Invitation to Pay Additional Fees and, Where Applicable, Protest Fee, Patent Cooperation Treaty Application No. PCT/US2021/045239, dated Oct. 18, 2021, 2 pages.

International Search Report and Written Opinion, Patent Cooperation Treaty Application No. PCT/US2021/045239, dated Jan. 20, 2022, 16 pages.

United States Office Action, U.S. Appl. No. 16/997,719, dated Jul. 29, 2022, 11 pages.

United States Office Action, U.S. Appl. No. 16/997,728, dated Jun. 16, 2022, 17 pages.

International Preliminary Report on Patentability from International Application No. PCT/US2021/045239, dated Feb. 16, 2023, 6 pp.

Prosecution History from U.S. Appl. No. 16/997,719, dated Jul. 29, 2022 through Nov. 14, 2022, 26 pp.

Prosecution History from U.S. Appl. No. 16/997,728, dated Jun. 15, 2022 through Apr. 21, 2023, 54 pp.

Response to Final Office Action dated Dec. 27, 2022 from U.S. Appl. No. 16/997,728, filed Apr. 27, 2023, 10 pp.

Final Office Action from U.S. Appl. No. 16/997,728 dated Nov. 13, 2023, 19 pp.

Office Action from U.S. Appl. No. 16/997,728 dated Jun. 12, 2023, 21 pp.

Response to Final Office Action dated Dec. 27, 2022 from U.S. Appl. No. 16/997,728, filed Apr. 27, 2023, 12 pp.

Response to Office Action dated Jun. 12, 2023 from U.S. Appl. No. 16/997,728, filed Sep. 12, 2023, 12 pp.

Office Action from U.S. Appl. No. 16/997,728 dated Mar. 11, 2024, 20 pp.

* cited by examiner

US 11,989,317 B2

MODIFYING ELEMENTS OF A SECURE DOCUMENT WORKFLOW BASED ON CHANGE IN PROFILE OF RECIPIENT

TECHNICAL FIELD

The disclosure generally relates to the field of secure documents, and more particularly relates to reducing elements of secure document workflow based on identity of a recipient of a secure document.

BACKGROUND

Conventional secure document infrastructure (e.g., electronic documents configured to accept legally binding signatures) are subject to bloat that hampers storage and bandwidth constraints and requires a high amount of avoidable back-and-forth network use. For example, certain types of secure document envelopes often require identity verification, which launch workflows where users are required to input information, upload high resolution images of identity documents, and the like. Some activities in these workflows are unnecessary where they are duplicative, where, while a requesting party may not have previously verified the identity of a user, a secure document service may have previously verified the user's identity in accordance with whatever standard is required.

SUMMARY

Systems and methods are disclosed herein for eliminating unnecessary activities in a workflows, thus resulting in bandwidth and storage efficiencies. In an embodiment, a secure document service receives a request for a user to perform a plurality of activities with respect to a secure document, and determines requirements for performing each respective activity of the plurality of activities. For example, the requirements may include completing a particular identity verification protocol. The secure document service retrieves profile data for the user, and determines, based on the profile data, a subset of the activities directed to achieving a result that is reflected in the profile data. For example, the profile may reflect that the identity verification protocol was completed in a different workflow, and thus the secure document service has already verified the user's identity. The secure document service transmits a modified version of the request to the user, the modified version eliminating the subset from the plurality of activities. For example, the secure document service omits the identity verification protocol from the workflow Systems and methods are also disclosed herein for modifying workflow when unexpected circumstances are encountered. In an embodiment, the secure document service receives a request for a user to perform a plurality of activities with respect to a secure document, a given activity of the plurality activities being assigned based on a known parameter of the user. For example, the given activity may be an identity verification protocol specific to a location that in which the user is known to reside. The secure document service transmits the request to the user, and, responsive to detecting an interaction by the user with the request, determines that the known parameter has changed. For example, the secure document service determines that the user is in fact in a different location than the known location. Responsive to determining that the known parameter has changed, the secure document service determines requirements for performing the plurality of activities based on a replacement parameter of the user. For example, the different location may have different governmental protocols for satisfying identity verification. The secure document service determines a replacement activity based on the requirements (e.g., a replacement identity verification protocol), and transmits a new request to the user, the new request replacing the given activity with the replacement activity.

In an embodiment, the secure document service directly determines lean workflow using machine learning. The secure document service receives a request for a user to perform a task with respect to a secure document. The secure document service extracts first information from the secure document, and extracts second information from a profile of the user. For example, the secure document service extracts a document type from the secure document, and extracts prior activity of the user from the user's profile. The secure document service inputs the first information and the second information into a machine learning model, and receives as output from the machine learning model a plurality of activities for performing the task. These activities omit activities that are part of a requirement for satisfying the request (e.g., identity verification protocol) where the user has previously satisfied that requirement (e.g., as shown in the user's profile information). The secure document service transmits a workflow comprising the plurality of activities to the user.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Secure Document Service System Environment

Figure 1:
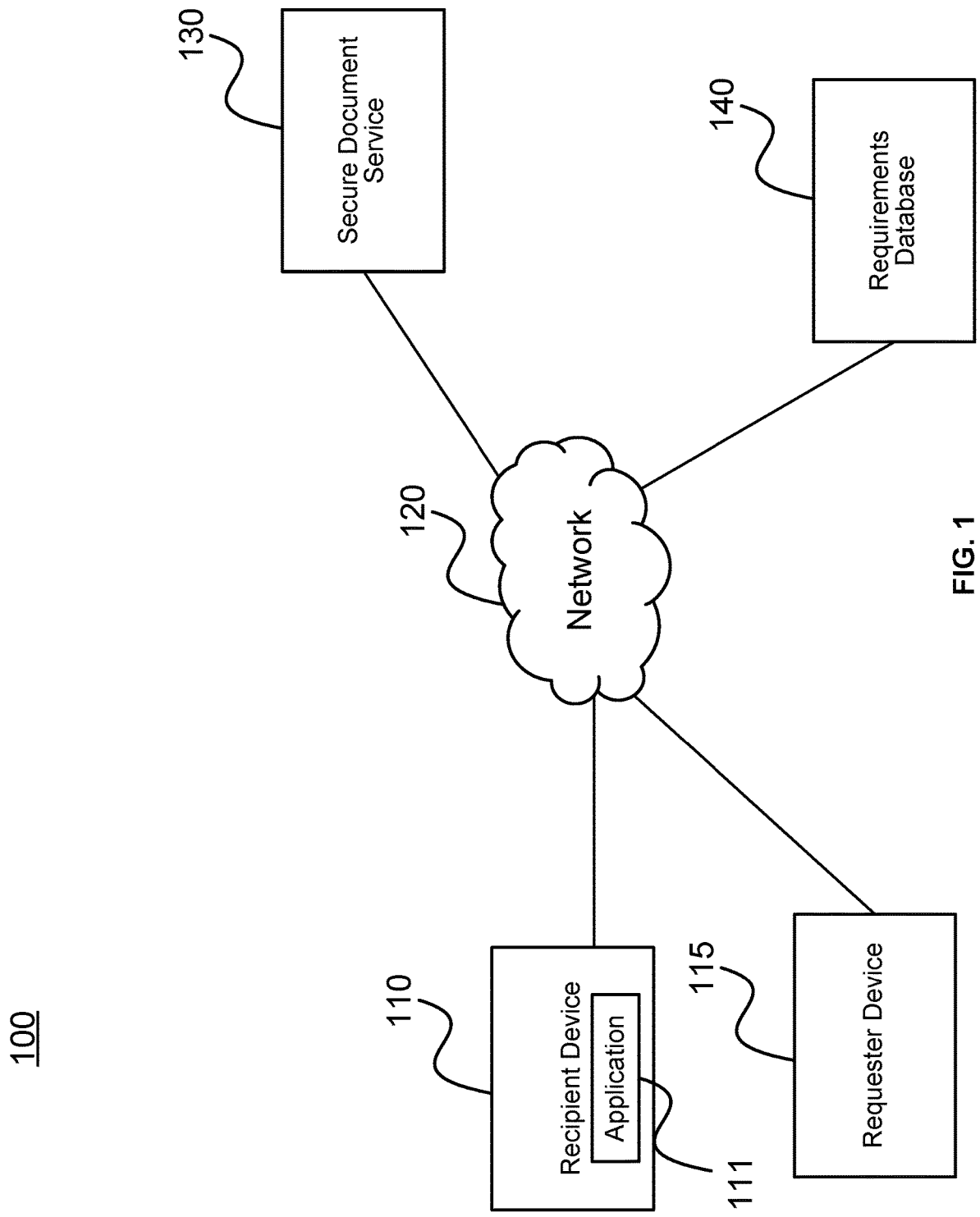
FIG. 1 illustrates one embodiment of a system environment showing a secure document service configured to modify workflow relating to a secure document request.

FIG. 1 illustrates one embodiment of a system environment showing a secure document service configured to modify workflow relating to a secure document request. Environment 100 includes recipient device 110 having application 111 installed thereon, requester device 115, network 120, secure document service 130, and requirements database 140. The elements of environment 100 are exemplary only, and more or fewer elements may be implemented without departing from the scope of the disclosure.

Environment 100 includes various client devices, such as recipient device 110 (with application 111 installed thereon) and requester device 115. The client devices communicate with secure document service 130 and/or administrator service 140 through network 120. The term client device, as used herein, may refer to a computing device such as smartphones with an operating system such as ANDROID® or APPLE® IOS®, tablet computers, laptop computers, desktop computers, electronic stereos in automobiles or other vehicles, or any other type of network-enabled device from which secure documents may be accessed or otherwise interacted with. Typical client devices include the hardware and software needed to input and output sound (e.g., speakers and microphone) and images, connect to the network 110 (e.g., via Wifi and/or 4G or other wireless telecommunication standards), determine the current geographic location of the client devices 100 (e.g., a Global Positioning System (GPS) unit), and/or detect motion of the client devices 100 (e.g., via motion sensors such as accelerometers and gyroscopes).

Recipient device 110 is a device of a user to which a request (also referred to as a secure document request) to perform activities with respect to a secure document is directed. A secure document (sometimes referred to herein as a "document") is an electronic document with security encoded in association therewith to ensure integrity of the document. An example of a secure document is a document for signature by a user of recipient device 110, where the document is unable to be modified by the user other than to add signatures to the document. Secure documents need not be signature documents, and may be any document that has security features that limit activity of a receiving user and/or otherwise use features that ensure the integrity of the documents. Secure documents need not be single documents, and instead may be a collection of content items including documents and other forms of information (e.g., an "envelope" including documents, spreadsheets, pictures, and so on), though the term "secure document" is used in non-limiting fashion in singular form throughout this disclosure for convenience. The user of recipient device 110 is referred to from time to time as a "signer" or a "signing user"—this use is non-limiting and for convenience only, and the user may be any user on the receiving end of a secure document request, where the request may but need not include a signature function. While only one recipient device 110 is depicted, any number of recipient devices may participate in a secure document request.

Recipient device 110, as depicted, has application 111 installed thereon. Any or all client devices in environment 100 may have application 111 installed thereon. Application 111 may be a stand-alone application downloaded by a client device from secure document service 130. Alternatively, application 111 may be accessed by way of a browser installed on the client device, accessing an application instantiated from secure document service 130 using the browser. In the case of a stand-alone application, browser functionality may be used by application 111 to access certain features of secure document service 130 that are not downloaded to the client device. Application 111 may be used by a client device to perform any activity relating to a secure document, such as to create, design, assign permissions, circulate, access, sign, modify, add pictorial content, and so on.

Requester device 115 is operated by a person requesting activities be performed by recipient device 110. The requesting person may, but need not, be a creator or administrator of the secure document. The term administrator, as used herein, may refer to a person who creates a secure document and/or who has authority to administer the document by changing, granting, or denying rights to, or restrictions on, performing activity with respect to the secure document. More than one administrator may be assigned to a secure document, and in such a case, the plural administrators may administer the secure document using a same administrator device 115, or using their own administrator devices. Any client device may act as an administrator device or a recipient device; a participant may input access credentials when accessing application 111, which will determine the participant's role with respect to a secure document.

As mentioned before, client devices access secure document service 130 and/or administrator service 140 through network 120. Network 120 is typically the Internet, but may be any network, including but not limited to a Local Area Network (LAN), a Metropolitan Area Network (MAN), a Wide Area Network (WAN), a mobile wired or wireless network, a private network, or a virtual private network. Secure document service 130 provides application 111 to client devices, and additionally performs functionality connected to secure documents, including creation, verification, rights management, storage, circulation, and so on. While secure document service 130 is depicted as a single entity, secure document service 130 may be implemented through functionality spread across and/or replicated across a plurality of servers. Moreover, some or all of the functionality of secure document service 130 may be integrated into application 111 for on-board processing at a client device. Further details of secure document service 130 are discussed below with respect to FIG. 2.

Requirements database 140 represents one or more databases that indicate or otherwise represent requirements incumbent on a user of recipient device 110 to complete the activities that are part of a secure document request. Exemplary requirements may include various activities for fulfilling identity verification. These requirements may act as prerequisites for performing other activities that are part of the secure document request. As will be explained with respect to FIG. 2, in order to improve network and storage use, secure document service 130 may determine that certain requirements are satisfied based on historical use by the recipient, and may omit these requirements from a resulting workflow.

Secure Document Service Implementation

Figure 2:
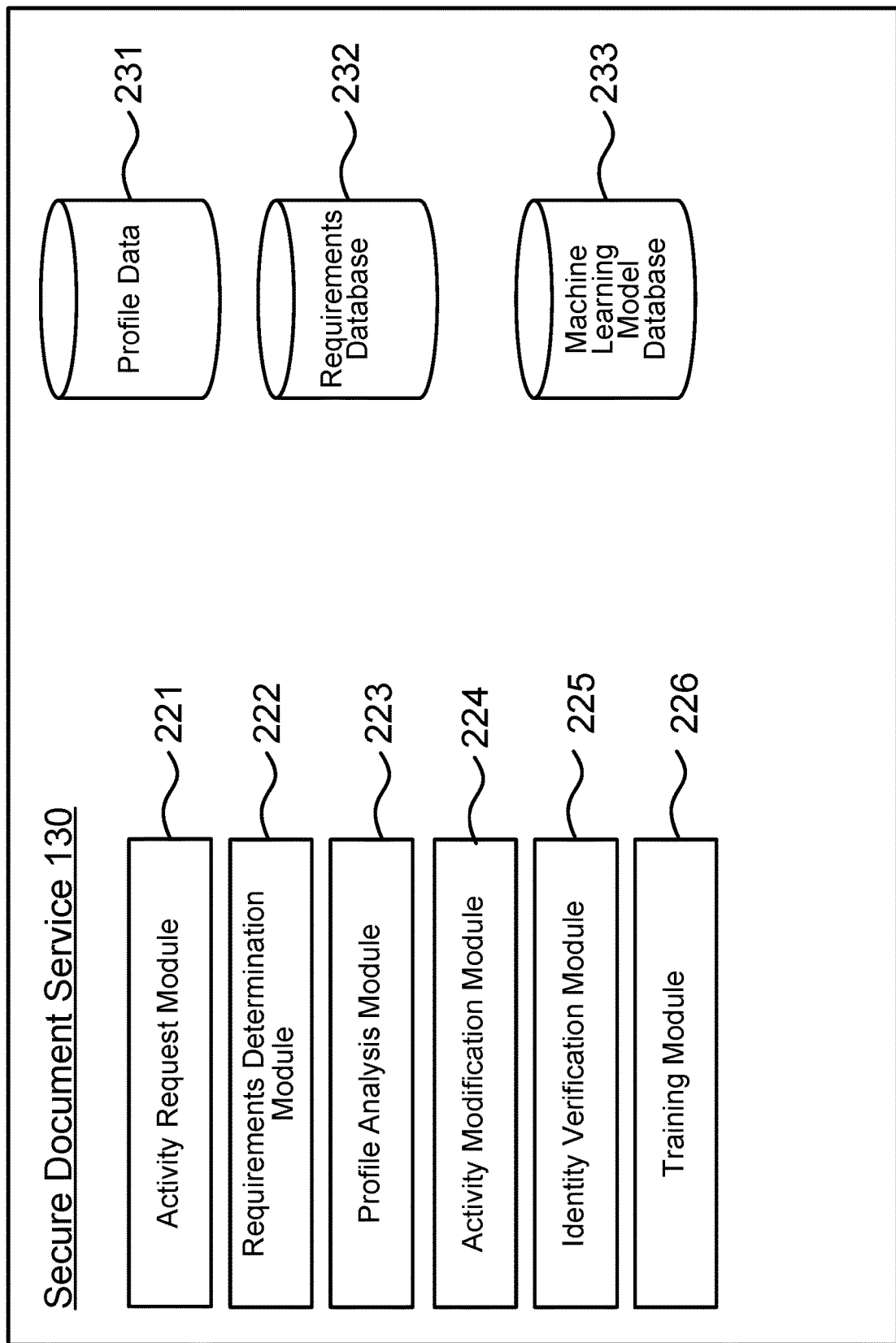
FIG. 2 illustrates one embodiment of exemplary modules and databases of the secure document service.

FIG. 2 illustrates one embodiment of exemplary modules and databases used by a secure document. Secure document service 130 is depicted as including activity request module 221, requirements determination module 222, profile analysis module 223, activity modification module 224, identity verification module 225, and training module 226. Secure document service 130 is also depicted as including profile data 231, requirements database 232, and machine learning model database 233. The modules and databases depicted in FIG. 2 are merely exemplary; fewer or more modules and/or databases may be used in order to achieve the functionality described herein.

Activity request module 221 detects a request from requester device 115 to have recipient device 110 perform a plurality of activities with respect to a secure document. Activities may include any interaction with a secure document, such as opening, reviewing, editing, signing, forwarding, and so on. Activities may also include interactions associated with the secure document, such as performing identity verification before being authorized to perform an interaction with the secure document. Activities may be expressly requested by the administrator (e.g., in configuring a signature block for signature by a user of recipient device 110), and/or may be added to the request by secure document service 130 (e.g., adding an identification protocol as described with reference to other modules below).

Requirements determination module 222 determines requirements associated with the activities. The term requirement, as used herein, may refer to conditions that trigger certain results that may affect, remove, or add activities depending on whether they are met. Requirements may be expressly input by the administrator. For example, the administrator may require that the recipient verify their identity through a particular protocol (e.g., a requirement that a government identification (ID) card be scanned). Requirements may be determined through heuristics. For example, requirements determination module 222 may determine that a document is of a certain type, and responsive to that determination, may query requirements database 232 for requirements associated with that type. Requirements determination module 222 may establish requirements based on an entry returned responsive to the query. As an example, a document may be of a type "government form", and requirements database 232 may indicate that documents of the type "government form" require specific means of identity verification. Requirements determination module 222 would thus establish a requirement for this document that includes that means of identity verification, adding such identity verification as an activity for inclusion with the request.

Requirements determination module 222 may establish requirements based on characteristics of the administrator. For example, requirements determination module 222 may determine a location of the administrator. Location determination may be performed based on an internet protocol (IP) address of requester device 115, based on a query to requester device 115 for location information (e.g., as determined using GPS or cell towers), or any other means of location determination. Location is merely one example; other characteristics of the administrator may be used, including registered home address, government registry information (e.g., address of a home owned by the administrator), credit score information, or any other information about the user that is either publicly accessible or in a profile of the administrator (e.g., data stored in profile data 231, such as historical use of secure document service 130 by the administrator). As further examples, characteristics of a profile may also include device fingerprint (that is, an aggregation of attributes of a user) or citizenship of the user.

The characteristics of the administrator may be directly, or indirectly, used to determine requirements associated with the characteristics. For example, different rules may be in place depending on the administrator's location (e.g., identity verification protocols may differ depending on whether the administrator is in Germany or Mexico, and government rules particular to those jurisdictions), and thus location may be directly used to determine requirements. As another example, a user's characteristics may in whole or in part be used to determine a trust score for that user. For example, the user's trust score may be determined based on information in profile data 231 (e.g., historical use, frequency of use, successful completion of secure document requests, etc.), which would be an indirect use of user characteristics. Where indirect use is performed, the result would itself be taken as a characteristic of the user. For example, requirements determination module 222 would consider a trust score to be a characteristic of the user. Requirements determination module 222 may compare the characteristics of the administrator against requirements database 232 to determine requirements associated with those characteristics. As mentioned above, this may include location and trust-based determinations.

Requirements determination module 222 may establish requirements based on characteristics of the recipient using any manner described above with respect to the administrator. Requirements determination module 222 may establish requirements based on both the characteristics of the recipient and the characteristics of the administrator. For example, identity verification requirements may be determined using requirements database 232 that satisfy jurisdictional requirements of both the countries of residence of the administrator and the recipient. Requirements determination module 222 may update requirements based on interactions by the recipient. For example, requirements determination module 222 may determine requirements based on profile data 231 showing that the recipient is located in a particular jurisdiction. Requirements determination module 222 may determine that the recipient is actually located in a different jurisdiction based on an interaction (e.g., the interaction being associated with an IP address in the different jurisdiction), and may update requirements based on that different jurisdiction (e.g., requiring a different identity verification protocol). As another example, requirements determination module 222 may determine that the recipient is using a new device and thus might prompt the recipient to verify their identity again despite having previously verified their identity. As yet another example, the requester may not know the country of citizenship of the recipient, and thus responsively requirements determination module 222 may require, e.g., a British citizen living in Germany that was previously verified to re-verify their identity again.

In an embodiment, requirements determination module 222 may determine requirements using a machine learning model (e.g., as trained using training module 227, described in further detail below), and stored in machine learning model database 233. Requirements determination module 222 may input the characteristics (e.g., as retrieved from and/or derived from) into a machine learning model. Requirements determination module 222 may additionally, or alternatively, input information extracted from the secure document (e.g., text and/or pictures from the document, the document itself, a type of the document, etc.). Requirements determination module 222 may receive as output from the machine learning model the requirements. The output of the machine learning model may include a workflow, or may be used to derive a workflow. The workflow may include a sequence of activities that is determined based on the requirements.

Profile analysis module 223 analyzes profiles of users (e.g., recipients, administrators) to determine characteristics of users where characteristics are not already present in profile data 231. Profile analysis module 223 retrieves profile data of those users from profile data 231. Profile analysis module 223 performs analysis using heuristics and/or machine learning. As an example, profile analysis module 223 may compute a trust score of a user. Where heuristics are used, for example, a user's age, credit score, past usage of secure document service 130, and so on may feed into an algorithm to determine the resulting trust score. Where machine learning is used, some or all of profile data 231 for the user may feed into a machine learning model trained to output a trust score that corresponds to the profile data. Trust scores are merely exemplary; profile analysis module 223 may compute any characteristic of a user.

Profile analysis module 223 may additionally or alternatively determine whether profile data of a user satisfies any activities corresponding to a request. For example, where there is a requirement that a user's identity be verified in a particular manner, and where profile data 231 reflects that the user has previously been verified in that manner, then profile analysis module 223 may determine that the user has previously satisfied the requirement. Profile analysis module 223 may thus indicate that the user does not need to perform the corresponding activity associated with satisfying the requirement as part of the request.

In an embodiment, users' profiles may indicate that those users work for companies. Companies may have profile information that may be imputed to the users in certain circumstances. Thus, profile analysis module 223 may determine whether the users are employed by a known company, and may determine whether a profile of the company is to be overlaid on top of the users' profiles (e.g., depending on the document parameters, such as whether the document is a company document or a personal document). Profile analysis module 223 may retrieve company profile information if the company profile is to be overlaid on top of a given user's profile.

The term workflow, as used herein, may refer to a collection of activities that together satisfy the request. Activity modification module 224 may modify workflows by adding and/or removing activities from the workflows. Activity modification module 224 adds and/or removes activities from the workflow to remove activities that are unnecessary (e.g., because their associated requirement can otherwise be satisfied based on profile data 231 corresponding to the recipient), and to add activities that are discovered as necessary (e.g., because their associated requirement cannot otherwise be satisfied).

Activity modification module 224 may determine, for example, that an identity verification protocol that was part of a request is not necessary because the requirement is met by prior use activity, and may thus remove the requirement from the workflow. As another example, activity modification module 224 may determine that an identity verification protocol that was part of a request is not necessary because it was conditioned on an assumption that the recipient was located in a particular jurisdiction, and it turns out that the recipient is in fact located in a different jurisdiction that does not share this requirement. As a counter-example, activity modification module 224 may determine that an identity verification protocol that was not part of a workflow is required (e.g., as determined by requirements determination module 222), and may thus add the identity verification protocol to the workflow. As yet another counter-example, activity modification module 224 may determine that because the user is in an unexpected location, an unexpected, different identity verification protocol is to be used (e.g., by having requirements determination module 222 reference the unexpected location against requirements database 232), and may add the different identity verification protocol to the workflow.

Identity verification module 225 initiates verification protocols based on the determined requirements. Identity verification module 225 may also determine, based on output from profile analysis module 223, whether some or all of verification protocols are necessary based on past user activity, and may omit some or all elements of verification protocols accordingly. For example, where government identification and survey questions are required as part of an identity verification protocol, and where the user has in the past provided the required government identification, identity verification module 225 may omit government identification verification elements from the activities. Exemplary verification protocols include: presenting a copy of government identification, authentication with an identity provider, authentication via one-time passcodes via SMS or Phone, verification with certificate-based authentication (PKI), authentication via biometrics, knowledge-based authentication, risk-based authentication, background check, agency check, government sanctions list, bureau check, electronic ID authentication, smartcard authentication, password authentication, remote online notary, in-person notary, witness, any combination thereof, and the like.

Training module 226 trains one or more machine learning models stored in machine learning model database 233. The machine learning models may be supervised or unsupervised models. For supervised learning, training data may include one or more of document type, jurisdiction associated with the document, attributes associated with a recipient and/or administrator (e.g., jurisdiction associated with recipient or administrator), content of document (e.g., certain keywords within certain portions of the document or within the document as a whole, weights applied depending on keyword location, etc., and/or a keyword-agnostic look at the content of the document), attributes of the document (e.g., metadata attributes showing creator, access privileges, date of creation, place of creation, and any other attribute), and any other aspect of the document. The training data may be paired with one or more labels (e.g., applied manually or automatically), the one or more labels naming requirements associated with a document. One or more machine learning models may be trained using training module 226 to take as input attributes of a user and/or a document, and to output requirements and/or information from which requirements may be derived (e.g., probabilities of requirements, to be compared, for example, to thresholds to determine whether the requirements should be applied). The trained models may be stored to machine learning model database 233 for use by requirements determination module 222. The training data may include any data. For example, the machine learning models may be trained using legislation documents. In such an example, the machine learning model may take as input actual legislation documents and may dynamically discover and/or update the identity verification requirements by country, industry, and/or document type. Using such documents as training data, the system may stay up to date as legality continues to change.

Profile data 231 includes profile data of users (e.g., recipients, administrators, and any other participants) of secure document service 130. The profile data may include data expressly input by the users (e.g., demographic and biographical information). The profile data may include data associated with the user that was not expressly input by the users (e.g., successful document completion rate, frequency of use, milestones met, common requirements that were successfully completed, trust scores, and so on). As part of the profile data 231, or as a separate database, secure document service 130 may include an identity evidence database. The identity evidence database may store the legal representations of ID documents that can be presented as proof a person's identity. For example, this may include representations, such as copies, similar to how a person would take a photocopy of their ID like most people do in the paper world when identifying someone. Such an identity evidence database also enables recipients to share identity information in a way that respect consumer privacy and data residency laws.

Requirements database 232 stores requirements in association with characteristics of users and/or documents, as described in the foregoing, and may include the functionality of requirements database 140. In an embodiment, requirements database 232 may include multiple requirements database, each corresponding to a different criterion (e.g., different jurisdiction). Machine learning model database 233 stores one or more machine learning models trained using training module 226.

Computing Machine Architecture

Figure 3:
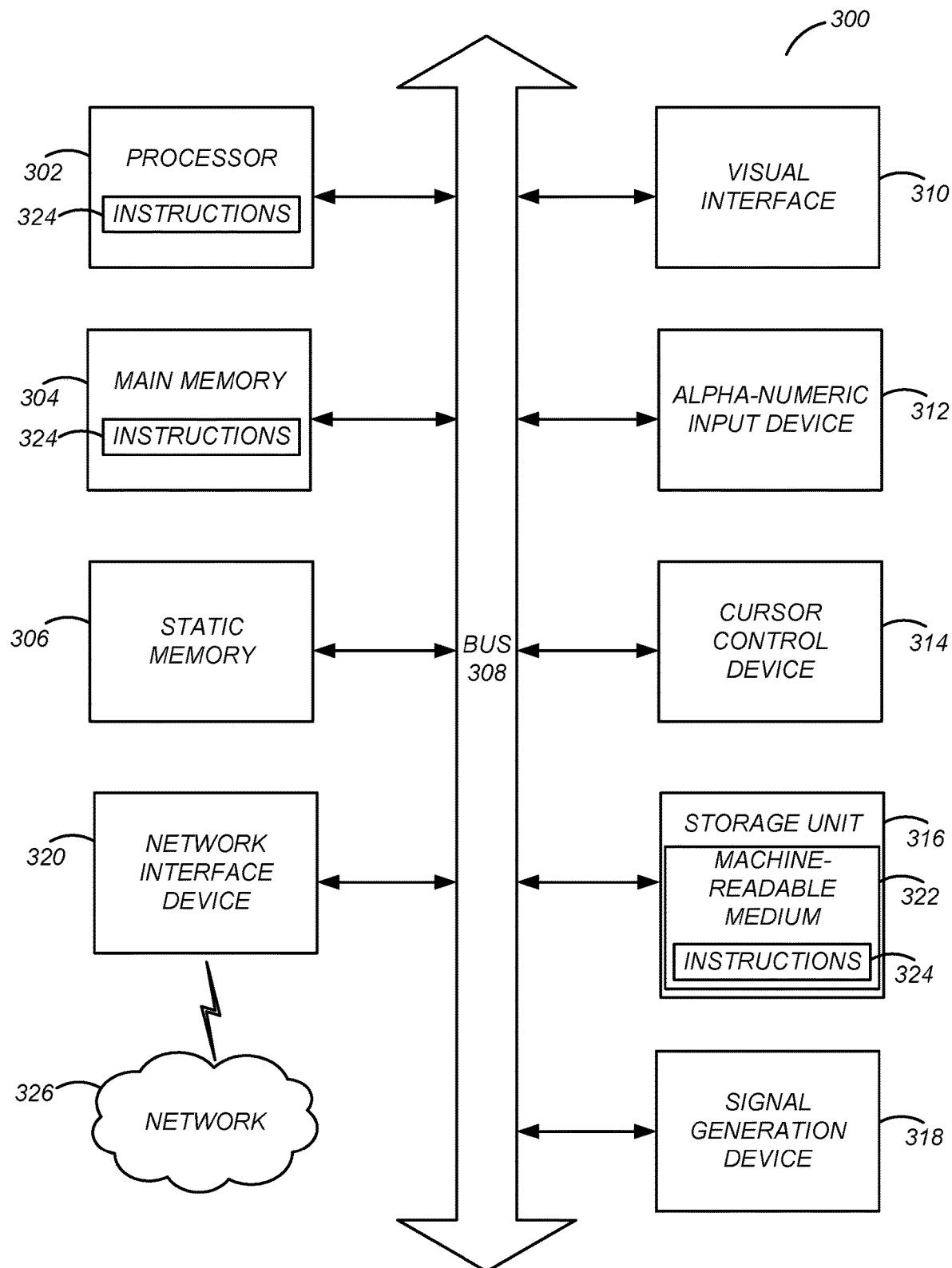
FIG. 3 is a block diagram illustrating components of an example machine able to read instructions from a machine-readable medium and execute them in a processor (or controller).

FIG. 3 is a block diagram illustrating components of an example machine able to read instructions from a machine-readable medium and execute them in a processor (or controller). Specifically, FIG. 3 shows a diagrammatic representation of a machine in the example form of a computer system 300 within which program code (e.g., software) for causing the machine to perform any one or more of the methodologies discussed herein may be executed. The program code may be comprised of instructions 324 executable by one or more processors 302. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 324 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 300 includes a processor 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include visual display interface 310. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 310 may include or may interface with a touch enabled screen. The computer system 300 may also include alphanumeric input device 312 (e.g., a keyboard or touch screen keyboard), a cursor control device 314 (e.g., a mouse, a trackball, a joystick, a motion sensor, or other pointing instrument), a storage unit 316, a signal generation device 318 (e.g., a speaker), and a network interface device 320, which also are configured to communicate via the bus 308.

The storage unit 316 includes a machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 (e.g., software) may be transmitted or received over a network 326 via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. The term "machine-readable medium" includes, but not be limited to, data repositories in the form of solid-state memories, optical media, and magnetic media.

Exemplary Use Case—Bypassing Identity Verification

Figure 4:
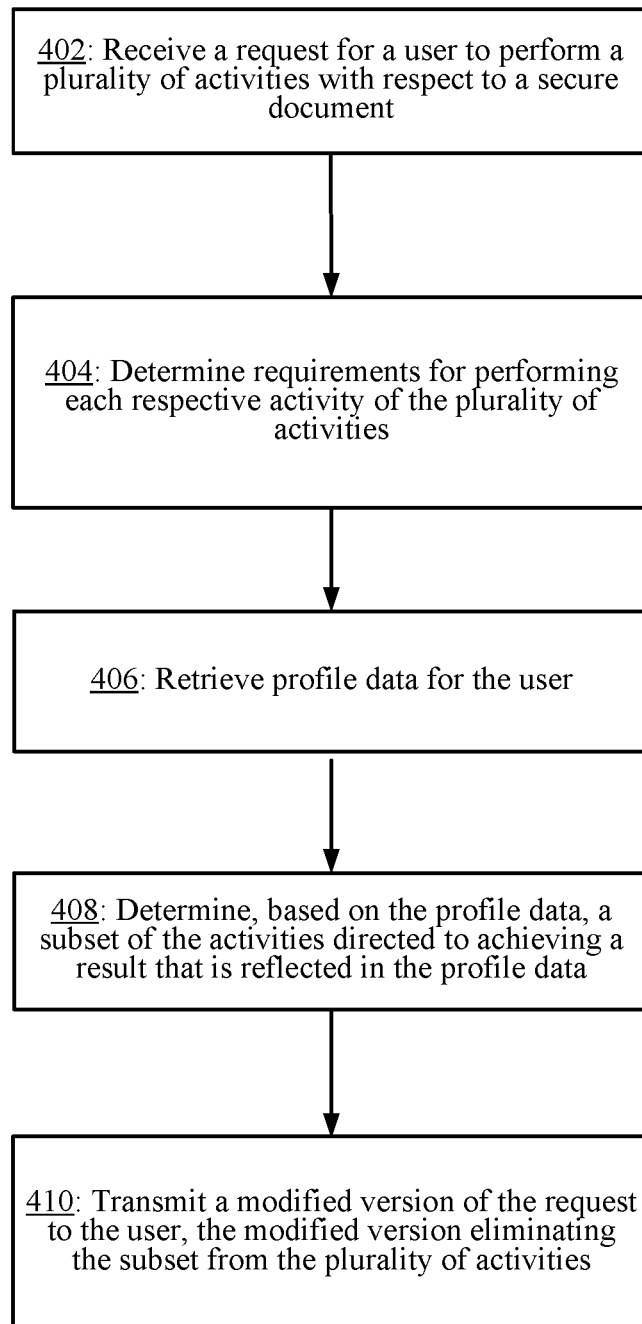
FIG. 4 illustrates one embodiment of an exemplary data flow of a process for bypassing portions of a workflow.

The following disclosure shows performance by secure document service 130 (e.g., executing modules using processor 302 of FIG. 3) in effecting various use cases. FIG. 4 illustrates one embodiment of an exemplary data flow of a process for bypassing portions of a workflow. Process 400 begins with secure document service 130 receiving 402 a request (e.g., using activity request module 221) for a user to perform a plurality of activities with respect to a secure document. As a non-limiting example, an administrator operating requester device 115 may request that recipient device 110 sign a contract that transfers assets from the recipient to the administrator.

Secure document service 130 determines 404 requirements for performing each activity of the plurality of activities (e.g., using requirements determination module 222). As an example, the administrator may have expressly required that the recipient comply with an identity verification protocol. As another example, the administrator may not have required that the recipient comply with the identity verification protocol, but requirements determination module 222 nonetheless determines that the identity verification protocol is required (e.g., based on the type of document and/or the location of the recipient). For example, it could be that documents that transfer assets of this nature require certain identity verification in the jurisdiction where the recipient and/or the administrator live. In an embodiment, determining the respective requirements may include determining a document type of the secure document (e.g., contract, etc.) and/or an activity type associated with the secure document (e.g., contract for transfer of real estate, etc.), and may compare the type(s) to entries of the requirements database. This may be supplemented by determining jurisdiction associated with the document (e.g., based on location of the recipient and/or the administrator). In an embodiment, there may be multiple requirements databases 140 that are each jurisdiction-specific, and the requirements database 140 selected may be chosen based on the determined jurisdiction.

Secure document service 130 retrieves 406 profile data for the user (e.g., from profile data 231), and determines 408, based on the profile data, a subset of the activities directed to achieving a result that is reflected in the profile data. For example, secure document service 130 may determine (e.g., using profile analysis module 223) that the recipient had previously satisfied the identity verification protocol, or that the recipient had previously satisfied some portion of the identity verification protocol (e.g., successfully verified a passport, but did not previously verify a driver's license). Secure document service 130 transmits 410 a modified version of the request to the user, the modified version eliminating the subset from the plurality of activities (e.g., eliminating the need to upload a passport photograph, or eliminating the identity verification protocol entirely). This results in a technical advantage of reducing network bandwidth usage and storage space for repeating previously stored activities, and also results in reduced risk to the user insofar as the user is able to avoid transmitting sensitive documents to myriad parties.

Exemplary Use Case—Automatic Workflow Modification

Figure 5:
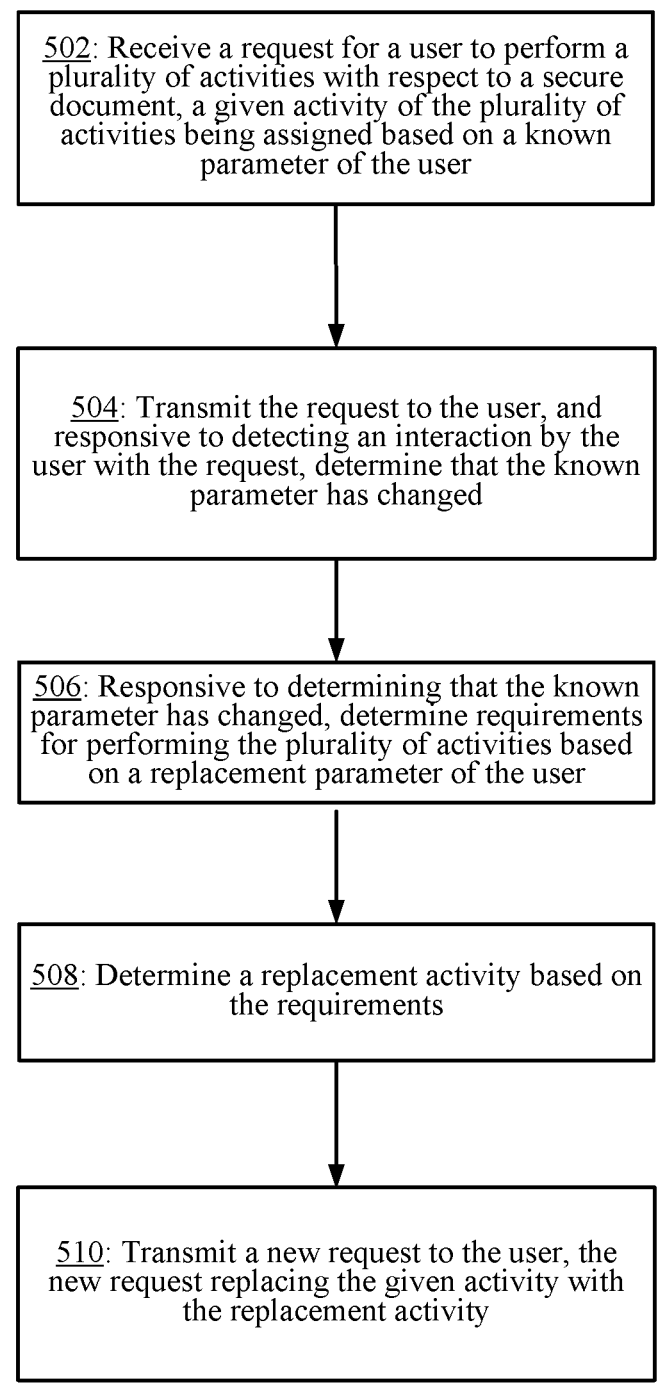
FIG. 5 illustrates one embodiment of an exemplary data flow of a process for modifying established workflow based on an unexpected circumstance.

FIG. 5 illustrates one embodiment of an exemplary data flow of a process for modifying established workflow based on an unexpected circumstance. Process 500 begins with secure document service 130 receiving 502 a request for a user to perform a plurality of activities with respect to a secure document (e.g., using activity request module 221), a given activity of the plurality of activities being assigned based on a known parameter of the user. For example, requirements determination module 222 may have determined that a given activity of identity verification using a particular protocol was required based on the recipient having been known to reside in a particular country (e.g., Germany), and activity modification module 224 may have added that identity verification protocol to the workflow for the secure document. Secure document service 130 then transmits 504 the request to the user, and, responsive to detecting an interaction with the request, determines that the known parameter has changed. For example, secure document service 130 may determine from the interaction that the recipient is actually located in Mexico, rather than Germany.

Responsive to determining that the known parameter has changed (that is, the recipient's location has changed from Germany to Mexico), secure document service 130 determines 506 requirements for performing the plurality of activities based on a replacement parameter of the user (e.g., using requirements determination module 222 to determine requirements where the user is in Mexico, rather than Germany, for completing the secure document request). In an embodiment, to determine the requirements, secure document service 130 assigns the recipient's current location to be the replacement parameter, and retrieves an entry from requirements database 140, the entry mapping the requirements to the current location. The requirements are determined therefrom by requirements determination module 222.

Optionally, rather than automatically go on to detect requirements, secure document service 130 prompts the recipient to confirm their location. For example, if the recipient is merely on vacation, and their known location is otherwise correct, then the secure document service 130 may determine that the original workflow remains applicable.

Secure document service 130 then determines 508 a replacement activity based on the requirements (e.g., a different identity verification protocol that satisfies the requirements for Mexico). Secure document service 130 transmits 510 a new request to the user (e.g., using activity request module 221), the new request replacing the given activity with the replacement activity. In an embodiment, the replacement may occur without the recipient having detected replacement activity. For example, while the recipient works through other parts of the secure document request, secure document service 130 may update the identity verification protocol and integrate it into the workflow in a manner invisible to the user.

Exemplary Use Case—Automatic Workflow Modification

Figure 6:
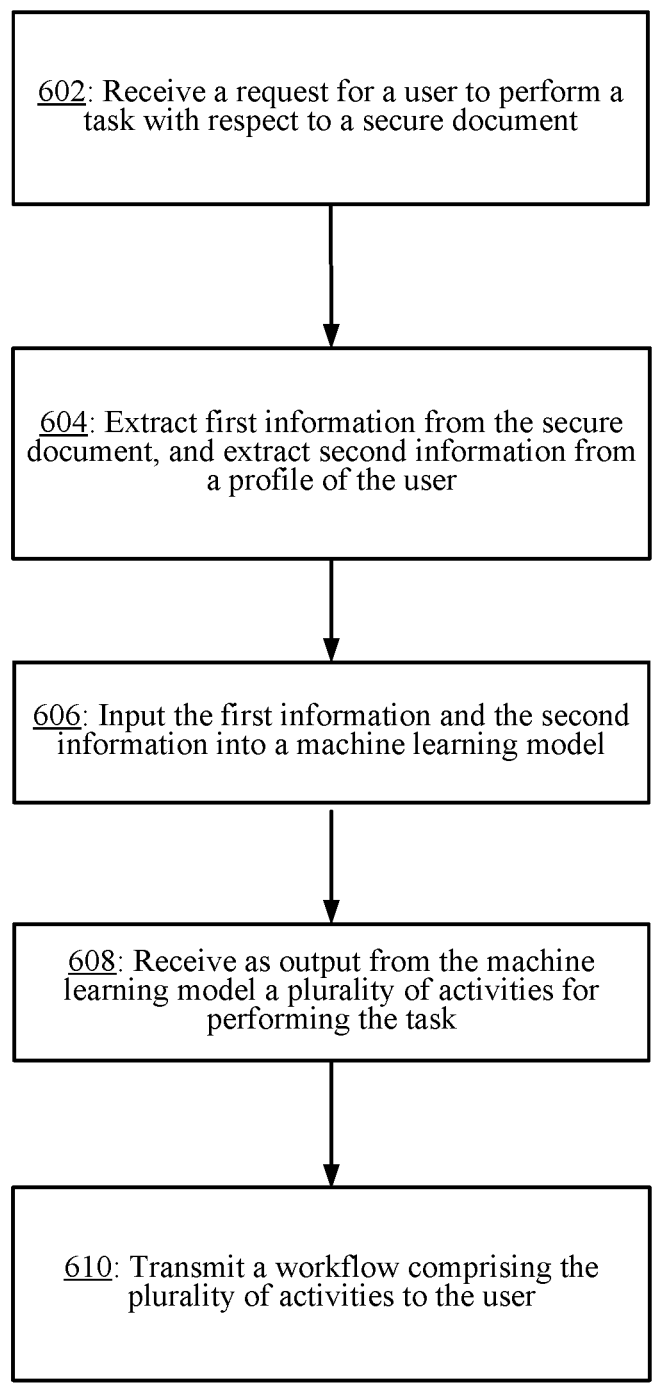
FIG. 6 illustrates one embodiment of an exemplary data flow of a process for using machine learning to automatically output workflow.

FIG. 6 illustrates one embodiment of an exemplary data flow of a process for using machine learning to automatically output workflow. Process 600 begins with secure document service 130 receiving 602 a request for a user to perform a task with respect to a secure document (e.g., using activity request module 221). Secure document service 130 extracts 604 first information from the secure document (e.g., contents, document type, activity type, keywords, etc.), and extracts second information from a profile of the user (e.g., trust score, biographic information, etc., as extracted from profile data 231). The extraction may be performed by requirements determination module 222. In an embodiment, further inputs may be input into the machine learning model, such as the user's current location, which may influence the output of the machine learning model.

Secure document service 130 inputs 606 the first information and the second information into a machine learning model (e.g., as retrieved from machine learning model database 333, optionally selected from a plurality of candidate models based on the first input and/or the second input). Secure document service 130 receives 608 as output from the machine learning model a plurality of activities for performing the task (e.g., based on the training data used by training module 226). Secure document service 130 transmits 610 a workflow comprising the plurality of activities to the user. Advantageously, secure document service 130 is able to, where both profile information and document information are input into the machine learning model, directly output activities that still need to be performed, while omitting activities that correspond to requirements that are already satisfied based on user's historical activity (e.g., prior-complete identity verification). That is, a leaner workflow may be directly output by the machine learning model.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    receiving, by a secure document service executed by a computing device and from a requester device, a request to perform a plurality of activities with respect to a secure document, the plurality of activities comprising an identity verification activity and an electronic signature activity, the identity verification activity of the plurality of activities being assigned from a plurality of candidate identification verification activities based on a known location associated with a recipient device;
    transmitting, by the secure document service and to the recipient device, the request to perform the plurality of activities with respect to the secure document;
    responsive to metadata indicative of location, determining, by the secure document service, that the known location associated with the recipient device has changed;
    responsive to determining that the known location associated with the recipient device has changed, determining, by the secure document service, requirements for performing the plurality of activities based on an updated location associated with the recipient device derived from the metadata;
    determining, by the secure document service, a replacement identity verification activity based on the requirements; and
    transmitting, by the secure document service and to the recipient device, a new request to perform the plurality of activities with respect to the secure document, the new request replacing the identity verification activity with the replacement identity verification activity, successful completion of the identity verification activity being a prerequisite to enabling the electronic signature activity.

2. The method of claim 1, wherein determining that the known location associated with the recipient device has changed comprises determining that a current location associated with the recipient device is different from the known location associated with the recipient device.

3. The method of claim 2, wherein determining that the current location associated with the recipient device is different from the known location associated with the recipient device comprises determining the current location associated with the recipient device based on an internet protocol (IP) address of the recipient device.

4. The method of claim 2, wherein determining the requirements for performing the plurality of activities based on the updated location associated with the recipient device derived from the metadata comprises:
    assigning the current location to be the updated location;
    retrieving an entry from a requirements database, the entry mapping the requirements to the current location; and
    determining the requirements based on contents of the entry.

5. The method of claim 4,
    wherein the requirements comprise identity verification requirements, and
    wherein determining the replacement identity verification activity comprises determining a workflow that, when completed by the recipient device, would satisfy the identity verification requirements.

6. The method of claim 1, wherein the new request replaces the identity verification activity with the replacement identity verification activity without providing indicia to the recipient device that a replacement has occurred.

7. Non-transitory computer-readable storage media comprising instructions that, when executed, are configured to cause processing circuitry to execute a secure document service configured to:
    receive, from a requester device, a request to perform a plurality of activities with respect to a secure document, the plurality of activities comprising an identity verification activity and an electronic signature activity, the identity verification activity of the plurality of activities being assigned from a plurality of candidate identification verification activities based on a known location associated with a recipient device;
    transmit, to a recipient device, the request to perform the plurality of activities with respect to the secure document;
    responsive to metadata indicative of location, determining that the known location associated with the recipient device has changed;
    responsive to determining that the known location associated with the recipient device has changed, determining requirements for performing the plurality of activities based on an updated location associated with the recipient device derived from the metadata;

determine a replacement identity verification activity based on the requirements; and transmit, to the recipient device, a new request to perform the plurality of activities with respect to the secure document, the new request replacing the identity verification activity with the replacement identity verification activity, successful completion of the identity verification activity being a prerequisite to enabling the electronic signature activity.

8. The non-transitory computer-readable storage media of claim 7, wherein, to determine that the known location associated with the recipient device has changed, the secure document service is configured to determine that a current location associated with the recipient device is different from the known location associated with the recipient device.

9. The non-transitory computer-readable storage media of claim 8, wherein, to determine that the current location associated with the recipient device is different from the known location associated with the recipient device, the secure document service is configured to determine the current location associated with the recipient device based on an internet protocol (IP) address of the recipient device.

10. The non-transitory computer-readable storage media of claim 8, wherein, to determine the requirements for performing the plurality of activities based on the updated location associated with the recipient device derived from the metadata, the secure document service is configured to:
assign the current location to be the updated location;
retrieve an entry from a requirements database, the entry mapping the requirements to the current location; and
determine the requirements based on contents of the entry.

11. The non-transitory computer-readable storage media of claim 10,
wherein the requirements comprise identity verification requirements, and
wherein, to determine the replacement identity verification activity, the secure document service is configured to determine a workflow that, when completed by the recipient device, would satisfy the identity verification requirements.

12. The non-transitory computer-readable storage media of claim 7, wherein the new request replaces the identity verification activity with the replacement identity verification activity without providing indicia to the recipient device that a replacement has occurred.

13. A system comprising:
memory; and
processing circuitry in communication with the memory, the processing circuitry configured to execute a secure document service configured to:
receive, from a requestor device, a request for a user to perform a plurality of activities with respect to a secure document, the plurality of activities comprising an identity verification activity and an electronic signature activity, the identity verification activity of the plurality of activities being assigned from a plurality of candidate identification verification activities based on a known location associated with a recipient device;
transmit, to a recipient device, the request to perform the plurality of activities with respect to the secure document;
responsive to metadata indicative of location, determine that the known location associated with the recipient device has changed;
responsive to a determination that the known location associated with the recipient device has changed, determine requirements for performing the plurality of activities based on an updated location associated with the recipient device derived from the metadata;
determine a replacement identity verification activity based on the requirements; and
transmit, to the recipient device, a new request to perform the plurality of activities with respect to the secure document, the new request replacing the identity verification activity with the replacement identity verification activity, successful completion of the identity verification activity being a prerequisite to enabling the electronic signature activity.

14. The system of claim 13, wherein, to determine that the known location associated with the recipient device has changed, the secure document service is configured to determine that a current location associated with the recipient device is different from the known location associated with the recipient device.

15. The system of claim 14, wherein, to determine that the current location associated with the recipient device is different from the known location associated with the recipient device, the secure document service is configured to determine the current location associated with the recipient device based on an internet protocol (IP) address of the recipient device.

16. The system of claim 14, wherein, to determine the requirements for performing the plurality of activities based on the updated location associated with the recipient device derived from the metadata, the secure document service is configured to:
assign the current location to be the updated location;
retrieve an entry from a requirements database, the entry mapping the requirements to the current location; and
determine the requirements based on contents of the entry.

17. The system of claim 16,
wherein the requirements comprise identity verification requirements, and
wherein, to determine the replacement identity verification activity, the secure document service is configured to determine a workflow that, when completed by the recipient device, would satisfy the identity verification requirements.

* * * * *